Patented Nov. 13, 1951

2,575,152

UNITED STATES PATENT OFFICE 2,575,152

PROCESS OF DISSOLVING SILK FIBERS

Thomas C. Whitner, Elizabeth, N. J.

No Drawing. Application September 6, 1950,
Serial No. 183,465

7 Claims. (Cl. 106—161)

This invention relates to the preparation of aqueous solutions of sericeous material and particularly to the preparation of copper-containing aqueous solutions in which are dissolved silk fibers.

In my copending application Ser. No. 162,385, I have described a method for making aqueous solutions of sericeous material which comprises dissolving cupric hydroxide in an aqueous solution of an alkali metal hydroxide in which is present also a water-soluble polyhydroxy alcohol, and afterwards dissolving silk fibers in this aqueous alkaline solution. The polyhydroxy alcohol serves as a solubilizing agent for cupric hydroxide, and thereby prevents any substantial proportion of cupric hydroxide being converted into cupric oxide due to contact with the aqueous solution of alkali metal hydroxide.

I have observed that cupric hydroxide and silk fibers can be dissolved in aqueous solutions of alkali metal hydroxides (without the aid of any extraneous solubilizing agent) provided the fibers and the metallic compound are in contact simultaneously with the aqueous alkaline solution and provided that unchanged silk fibers are present while dissolution of the copper compound is being effected. Under these conditions both the copper compound and silk fibers dissolve accompanied by little or negligible formation of insoluble copper oxide. After solution of the two materials is effected, any undissolved silk fibers and copper compound can be removed, for example, by filtration of the aqueous liquid. The filtered liquid then can be employed for impregnation of cellulose fibers with sericeous material.

In carrying out the above-indicated operation, silk fibers and copper hydroxide are admixed simultaneously in relatively small quantities with the aqueous alkaline liquid and then the admixture of liquid and solids is stirred. If all of the silk fibers should dissolve before substantially complete solution of cupric hydroxide is obtained, then an additional quantity of the fibers only is admixed with the liquid.

As an alternative procedure silk fibers and cupric hydroxide may be admixed with water and then an aqueous solution of the alkali metal hydroxide added slowly to the mixture. During dissolution of the copper compound and fibers, an excess of unchanged silk fibers is kept in contact with the aqueous liquid.

Still another modification of my process comprises the following steps. Silk fibers are admixed with an aqueous solution of a water-soluble cupric salt, and to this admixture is added slowly and with stirring an aqueous solution of an alkali metal hydroxide. At first there is formed a precipitate of cupric hydroxide, but on continued addition of the alkaline solution there will be effected dissolution of cupric hydroxide and of silk fibers. As the latter dissolve, more fibers are admixed with the aqueous liquid so that unchanged fibers are always present. After all copper hydroxide has dissolved, the liquid may be separated from undissolved fibers by filtration.

The following examples will furnish additional illustrations of my invention.

*Example 1.*—Water and copper hydroxide were admixed in the proportion of 15 parts of liquid to 0.3 part of the hydroxide. Next, for each 15 cc. of liquid originally employed there were added, slowly and with stirring, 2.5 cc. of an aqueous solution containing 0.8 g. of sodium hydroxide per 5 cc. During addition of the aqueous alkali, an excess of undissolved silk fibers was kept in contact with the aqueous mixture. After all of the aqueous alkali was added, the mixture was stirred for a short time and then filtered. The quantity of alkali metal hydroxide used in this instance was sufficient to furnish an aqueous solution containing substantially 2.3 per cent of sodium hydroxide.

Bleached cotton cloth was impregnated with some of the filtered solution by working therein at room temperature. Next, the cloth was permitted to drain at room temperature, and afterwards the fabric was washed with dilute aqueous sulfuric acid and then with water. The treated fabric was dried. Increase in weight of the sample, due to treatment, indicated it contained 2.78 per cent of impregnating sericeous material.

*Example 2.*—Water and cupric hydroxide were admixed in the proportion of 15 parts of liquid to 0.8 part of solid. Silk fibers then were added to this admixture. Next, for each 15 cc. of liquid originally employed, there were added (slowly and with stirring) 5 cc. of water in which was dissolved 0.5 g. of sodium hydroxide. As the silk fibers (and copper hydroxide) dissolved, more of them were admixed with the aqueous liquid until a considerable excess of undissolved and unchanged fibers was present. The mixture of fibers and aqueous liquid was allowed to stand overnight at room temperature, and then undissolved material was separated by filtration. In this example, the quantity of sodium was sufficient to give an aqueous solution containing substantially 2.5 per cent of the alkali.

A portion of the filtered liquid, after dilution with an equal volume of water, was made acidic with dilute aqueous sulfuric acid and permitted to stand at room temperature until the sericeous material had precipitated. The precipitate was filtered, washed well with water, dried and weighed. In this manner it was estimated that the filtered liquid contained 0.468 g. of sericeous material per 10 cc. of solution.

*Example 3.*—Water and cupric hydroxide were admixed in the proportion of 15 parts of liquid to 0.3 part of solid. For each 15 cc. of water originally used, there were added (slowly and with stirring) 5 cc. of water in which was dissolved 0.3 g. of lithium hydroxide after silk fibers had been admixed with the aqueous suspension of cupric hydroxide. As the silk fibers dissolved, more of them were admixed with the aqueous liquid so that an excess of unchanged fibers was always present. The mixture was permitted to stand overnight at room temperature and then undissolved fibers were separated by filtration. In this case, the proportion of lithium hydroxide in the filtered solution was equivalent to 1.5 per cent solution.

Bleached cotton cloth was impregnated with some of the filtered solution by working therein at room temperature. Afterwards, the cloth was allowed to drain at room temperature, and then washed successively with dilute aqueous sulfuric acid and water. The washed fabric was dried by exposure to the atmosphere.

This treated sample and one of the original cloth were dyed separately. In each instance the dye bath consisted of 100 parts of water per 1 part of cloth and 10 per cent (on weight of sample) of soluble Eosin (sodium salt of tetrabromofluorescin). The fabrics were placed in the respective baths at room temperature, then the temperature of the baths was increased to 70° C. over a period of 30 minutes, and kept at 70–75° C. for 30 minutes. Then the baths were allowed to cool to room temperature, the samples removed and rinsed well with cold water and dried.

The untreated cloth dyed to a light pink color. The impregnated fabric dyed to a light red color.

*Example 4.*—Silk fibers were admixed with an aqueous solution containing 1.023 g. of copper chloride ($CuCl_2 \cdot 2H_2O$) per 10 cc. To this mixture was added slowly and with stirring an equal volume of an aqueous solution containing 1.4 g. of potassium hydroxide per 10 cc. At first cupric hydroxide was precipitated, but on continued addition of the aqueous alkali both the silk fibers and copper hydroxide dissolved in the aqueous liquid. As the silk dissolved, additional portions of these fibers were admixed with the liquid so that at all times some undissolved and unchanged fibers were present. When all the alkaline solution had been added, the mixture of aqueous liquid and undissolved fibers was allowed to stand for 1 hour at room temperature, and then the undissolved material was separated by filtration.

Bleached cotton cloth was saturated with some of the filtered liquid, allowed to drain at room temperature, and then washed with dilute aqueous hydrochloric acid. Afterwards, the cloth was rinsed well with water and dried. Increase in its weight indicated it contained 1.5 per cent of impregnating sericeous material.

*Example 5.*—Silk fibers were admixed with an aqueous solution containing 6.82 g. of copper chloride ($CuCl_2 \cdot 2H_2O$) per 20 cc. To this mixture was added slowly and with stirring (for each 20 cc. of copper solution) 30 cc. of an aqueous solution containing 3.67 g. of lithium hydroxide. During addition of the solution of alkali metal hydroxide, more silk fibers were admixed continually with the aqueous liquid. Eventually a very thick, viscous, almost pasty mass was obtained in which silk fibers no longer appeared to dissolve. The quantity of lithium hydroxide used this time was sufficient to furnish an aqueous solution containing approximately 3.5 per cent of alkali metal hydroxide.

The viscous mass was placed in a glass funnel whose stem was plugged with glass fibers and then allowed to drain. Bleached cotton cloth was worked at room temperature in some of the filtrate until it was saturated therewith. Afterwards, the fabric was permitted to drain and to dry while exposed to the atmosphere. Then it was washed successively with dilute aqueous sulfuric acid and with water and afterwards dried. Its increase in weight due to this treatment indicated the fabric contained 9.6 per cent of impregnating sericeous material.

*Example 6.*—The insoluble residue obtained by filtration of the liquid mass in Example 5 was admixed with a small volume of water, and the mixture allowed to settle at room temperature. The supernatent liquid was withdrawn and filtered.

Bleached cotton cloth was impregnated with some of the filtered solution, and then allowed to drain and to dry while exposed to the atmosphere. Afterwards, the fabric was washed successively with dilute aqueous sulfuric acid and with water and then dried. Increase in weight of the sample after this treatment indicated it contained 3.3 per cent of impregnating sericeous material.

From the foregoing disclosures it will be seen that my invention comprises the preparation of aqueous solutions of water-soluble copper-containing complexes derived from silk and that such solutions can be employed for impregnating cellulose fibers with sericeous material. The method disclosed herein involves simultaneously dissolving silk fibers and copper hydroxide in an aqueous solution of an alkali metal hydroxide. And during dissolution of the fibers and copper compound an excess of unchanged silk fibers is maintained in contact with the aqueous liquid. The concentration of alkali metal hydroxide in the aqueous liquid should not be less than about 0.5 per cent and not more than about 4 per cent by weight. Preferably the alkaline aqueous solution is substantially saturated with respect to both copper hydroxide and silk fibers. When this latter condition is attained, the aqueous solution of copper-complex may be filtered to separate any undissolved material. The clear liquid filtrate, if necessary or desirable, can be diluted with water and thereby vary the concentration of sericeous material dissolved therein.

As previously mentioned, I may modify the above procedure by admixing silk fibers with an aqueous solution of a water-soluble copper salt, e. g., cupric chloride or sulfate, and then adding an aqueous solution of an alkali metal hydroxide to the admixture. In this instance, the quantity of aqueous solution added to that of the copper salt should be sufficient to convert all the copper salt into cupric hydroxide and to give a concentration of alkali metal hydroxide within the limits mentioned above. Also, during addition of the alkaline solution if all of the silk fibers should dissolve, then additional quantity or quantities of the fibers are admixed with the aqueous liquid. In this case too, the resulting solution should be substantially saturated with respect to silk fibers and copper hydroxide.

In the immediately preceding modification of my invention, if a fairly concentrated solution of the cupric salt be employed, then dissolution of silk fibers (and simultaneously of cupric hydroxide) can lead to the formation of a very thick viscous liquid, an appreciable proportion of which will be retained by undissolved and unchanged fibers. Or, more silk fibers may be converted into the copper-containing complexes than can be held in solution by the quantity of water actually employed. In either case, the viscous liquid is separated as well as possible from undissolved material and then the undissolved material is extracted with water. Afterwards, the aqueous extract is separated, for example, by filtration from any material which does not dissolve therein. The advantages of such an operation are: (1) copper-containing complexes or an aqueous solution of them are recovered from the insoluble residue, and (2) an aqueous solution or extract of copper-containing complexes is obtained in which the proportion of alkali metal hydroxide is much less than that in the solution intially separated from the undissolved material and in some instances this proportion will be less than about 0.5 per cent.

It should be noted that in the method disclosed there are three precautions which should be observed: (1) both unchanged silk fibers and copper hydroxide should be in contact simultaneously with the aqueous liquid containing dissolved alkali metal hydroxide and it is well to maintain an excess of undissolved and unchanged fibers always in contact with the aqueous alkaline liquid while the copper compound is dissolving; (2) the silk fibers and copper hydroxide, particularly the latter compound, should be admixed in small quantities with the aqueous alkaline liquid; and (3) in those instances in which unchanged fibers are admixed with an aqueous solution of a cupric salt or silk fibers and copper hydroxide are admixed with water only and then aqueous alkali added to the mixture, addition of the aqueous alkaline solution should be made slowly and in small portions. If these precautions are observed, then there is very little or only a negligible proportion of copper hydroxide lost as insoluble cupric oxide. By the term "unchanged fibers" I mean silk fiber as such or those silk fibers which have not reacted with the copper hydroxide to furnish water-soluble copper-containing complexes.

In the method of my copending application Ser. No. 162,385, in which is disclosed employment of an aqueous solution containing both an alkali metal hydroxide and a polyhydroxy alcohol dissolved therein, it is possible to saturate the aqueous alkaline solution with cupric hydroxide only and afterwards to dissolve silk fibers in the aqueous solution containing the dissolved copper compound. Such a two-step procedure is not feasible in the method of this invention. In the first place, cupric hydroxide is substantially insoluble in aqueous of alkali metal hydroxides when the concentration of the alkali falls within the limits herein specified. In the second place, if cupric hydroxide be left in contact with an aqueous solution of an alkali metal hydroxide, then the copper hydroxide changes into cupric oxide as evidenced by the change in color from blue to black. The rate of change depends upon the concentration of alkali metal hydroxide and becomes more rapid with increasing concentrations of the alkali. Cupric oxide is unsuitable for my present purpose and I seek to avoid its formation by having both silk fibers and cupric hydroxide simultaneously in contact with the aqueous solution of alkali and by keeping undissolved and unchanged fibers in excess until the aqueous solution is substantially saturated with copper hydroxide. Afterwards, the aqueous solution of copper-complex is separated from undissolved silk fibers and also from undissolved copper hydroxide, if the latter substance is present.

As illustrated in the examples, the solutions made in accordance with this invention can be employed for impregnating cellulose fibers with sericeous material. The cellulose fibers which are applicable for this treatment may be unbleached, bleached or mercerized.

The silk fibers suitable for my purpose should be substantially free of silk gum as well as of weighting agents such as tin salts. If desired, these fibers may be bleached prior to dissolution with copper hydroxide in the aqueous alkaline liquid.

What I claim is:

1. The process which comprises dissolving silk fibers and cupric hydroxide simultaneously in an aqueous solution of substantially only an alkali metal hydroxide until said aqueous solution is substantially saturated with respect to cupric hydroxide and silk fibers, and continually keeping unchanged silk fibers in contact with said aqueous solution while said dissolution is being effected, the concentration of said alkali metal hydroxide being not less than about 0.5 per cent and not more than about 4 per cent by weight.

2. The process according to claim 1 in which the alkali metal hydroxide is potassium hydroxide.

3. The process according to claim 1 in which the alkali metal hydroxide is sodium hydroxide.

4. The process according to claim 1 in which the alkali metal hydroxide is lithium hydroxide.

5. The process which comprises dissolving silk fibers and cupric hydroxide simultaneously in an aqueous solution of substantially only an alkali metal hydroxide until said aqueous solution is substantially saturated with respect to cupric hydroxide and silk fibers, and continually keeping unchanged silk fibers in contact with said aqueous solution while said dissolution is being effected, the concentration of said alkali metal hydroxide being not less than about 0.5 per cent and not more than about 4 per cent by weight, separating said aqueous solution from undissolved material, and extracting said undissolved material with water.

6. The process which comprises admixing silk fibers with an aqueous solution of substantially only a water-soluble copper salt, adding an aqueous solution of substantially only an alkali metal hydroxide to said solution of copper salt until substantially all copper is precipitated as cupric hydroxide, keeping unchanged silk fibers continually in contact with the aqueous liquid, and continuing to add said solution of alkali metal hydroxide until the aqueous solution is substantially saturated with respect to cupric hydroxide and silk fibers and the concentration of alkali metal hydroxide in the aqueous liquid is not less than about 0.5 per cent and not more than about 4 per cent by weight.

7. The process which comprises admixing silk fibers with an aqueous solution of substantially only a water-soluble copper salt, adding an aqueous solution of substantially only an alkali metal hydroxide to said solution of copper salt until substantially all copper is precipitated as cupric hydroxide, keeping unchanged silk fibers continually in contact with the aqueous liquid, and continuing to add said solution of alkali metal hydroxide until the aqueous solution is substantially saturated with respect to copper hydroxide and silk fibers and the concentration of alkali metal hydroxide in the aqueous liquid is not less than about 0.5 per cent and not more than about 4 per cent by weight, separating the aqueous liquid from undissolved material, and extracting said undissolved material with water.

THOMAS C. WHITNER.

No references cited.